(12) United States Patent
Buchanan

(10) Patent No.: US 9,683,620 B2
(45) Date of Patent: Jun. 20, 2017

(54) BRAKE PAD SPREADER TOOL

(71) Applicant: Lisle Corporation, Clarinda, IA (US)

(72) Inventor: Nigel Buchanan, Fife (GB)

(73) Assignee: Lisle Corporation, Clarinda, IA (US)

( * ) Notice: Subject to any disclaimer, the term of this patent is extended or adjusted under 35 U.S.C. 154(b) by 52 days.

(21) Appl. No.: 14/383,350

(22) PCT Filed: Feb. 27, 2013

(86) PCT No.: PCT/GB2013/050480
§ 371 (c)(1),
(2) Date: Sep. 5, 2014

(87) PCT Pub. No.: WO2013/132229
PCT Pub. Date: Sep. 12, 2013

(65) Prior Publication Data
US 2015/0052718 A1  Feb. 26, 2015

(30) Foreign Application Priority Data

Mar. 5, 2012 (GB) .................................. 1203829.5
Dec. 7, 2012 (GB) .................................. 1222039.8

(51) Int. Cl.
*F16D 65/00* (2006.01)
*B25B 27/00* (2006.01)
(Continued)

(52) U.S. Cl.
CPC .......... *F16D 65/0043* (2013.01); *B25B 5/068* (2013.01); *B25B 27/0035* (2013.01);
(Continued)

(58) Field of Classification Search
CPC . B25B 27/00; B25B 27/0021; B25B 27/0028; B25B 27/12; B25B 27/306
(Continued)

(56) References Cited

U.S. PATENT DOCUMENTS 971,438 A     9/1910  Gillitt
1,339,448 A   5/1920  Forsman et al.
(Continued)

FOREIGN PATENT DOCUMENTS

DE   90045505 U1   6/1990
GB     782365     9/1957
(Continued)

OTHER PUBLICATIONS

Mar. 26, 1989 Invention Disclosure Agreement—George P. Juliano—Brake Piston Compressor Kit.
(Continued)

*Primary Examiner* — Monica Carter
*Assistant Examiner* — Seahee Yoon
(74) *Attorney, Agent, or Firm* — Banner & Witcoff, Ltd.

(57) ABSTRACT

A hand held brake pad spreader tool for use with a brake caliper (90) of the kind having a sliding caliper body supporting an opposed pair of brake pads arranged to sandwich a brake disc and a piston (92) for clamping the brake pads against the brake disc. The tool comprising a body (20); a handle (22) on the body; an abutment on the body for engaging the caliper body; an elongate member (40) supported by the body for longitudinally sliding movement relative thereto, the elongate member having a piston engagement means (50) for engaging the piston; a manually actuable moveable member (30) supported on the body adjacent to the handle; and drive means (60) coupled between the moveable member (30) for moving the elongate member (40) longitudinally from a first retracted position to a second driving position in which the piston engagement means is in driving engagement with the piston when the abutment is in engagement with the caliper body to move the piston to spread the brake pads apart. At least a portion of the elongate member in driving engagement with the piston is
(Continued)

mounted in the body for free rotation both clockwise and anti-clockwise. The tool further comprises means for rotating the portion of the elongate member.

14 Claims, 13 Drawing Sheets

(51) Int. Cl.
  *B25B 5/06* (2006.01)
  *F16D 121/04* (2012.01)
(52) U.S. Cl.
  CPC ...... *F16D 65/0068* (2013.01); *F16D 2121/04* (2013.01); *Y10T 29/53683* (2015.01)
(58) Field of Classification Search
  USPC .................. 269/239, 255, 252, 270, 278
  See application file for complete search history.

(56) References Cited

U.S. PATENT DOCUMENTS

| | | | |
|---|---|---|---|
| 2,043,140 | A | 6/1936 | Wilmesherr |
| 2,160,652 | A | 5/1939 | Feigh |
| 2,249,651 | A | 7/1941 | Gilbert |
| 2,575,412 | A | 11/1951 | Fechter |
| 3,426,752 | A | 2/1969 | Laico |
| 3,427,016 | A | 2/1969 | Harris |
| 3,492,854 | A | 2/1970 | Eppler |
| 3,654,689 | A | 4/1972 | Schwarz |
| 3,705,581 | A | 12/1972 | Drake |
| 3,835,522 | A | 9/1974 | Ward |
| 4,220,322 | A | 9/1980 | Hobday |
| 4,253,648 | A | 3/1981 | Meeks |
| 4,893,801 | A | 1/1990 | Flinn |
| 4,926,722 | A | 5/1990 | Sorensen et al. |
| 5,003,681 | A | 4/1991 | Schley |
| 5,018,261 | A | 5/1991 | Markous |
| 5,170,682 | A | 12/1992 | Sorensen et al. |
| 5,375,309 | A * | 12/1994 | Dunn ............... B25B 27/10 29/237 |
| 5,709,372 | A | 1/1998 | Lii |
| 5,732,936 | A | 3/1998 | Lii |
| 6,195,863 | B1 | 3/2001 | Blake |
| 6,378,185 | B1 | 4/2002 | Ratchovsky et al. |
| D457,795 | S | 5/2002 | Mohammed et al. |
| 6,523,238 | B1 * | 2/2003 | Priddy ............. B25B 27/0021 29/239 |
| 6,574,846 | B1 * | 6/2003 | Kang ............... B25B 27/0021 29/239 |
| 6,585,243 | B1 | 7/2003 | Li |
| 6,678,931 | B1 * | 1/2004 | Tatasciore ......... B25B 27/0035 29/239 |
| 6,874,217 | B2 | 4/2005 | Ploeger et al. |
| 7,076,850 | B2 | 7/2006 | Ploeger et al. |
| 7,155,792 | B1 | 1/2007 | Miller, Jr. |
| 7,194,948 | B2 * | 3/2007 | Liu ................. F16D 65/0043 29/239 |
| 7,748,095 | B1 * | 7/2010 | Phane ............. B25B 27/0035 269/6 |
| 8,276,251 | B2 | 10/2012 | Mitchell |
| 8,393,063 | B2 | 3/2013 | Hodges et al. |
| 2002/0070490 | A1 | 6/2002 | Klimach et al. |
| 2004/0123438 | A1 | 7/2004 | Kang |
| 2004/0134052 | A1 * | 7/2004 | Ploeger ........... B25B 27/0035 29/239 |
| 2004/0255445 | A1 | 12/2004 | Ploeger et al. |
| 2005/0000073 | A1 * | 1/2005 | Ploeger ........... B25B 27/0035 29/239 |
| 2007/0051214 | A1 * | 3/2007 | Tyler ................ B25B 5/163 81/367 |
| 2011/0010906 | A1 | 1/2011 | Mitchell |
| 2012/0216380 | A1 * | 8/2012 | Chen ............... B25B 27/0021 29/267 |

FOREIGN PATENT DOCUMENTS

| | | |
|---|---|---|
| GB | 2194989 A | 3/1988 |
| GB | 2487631 A | 8/2012 |

OTHER PUBLICATIONS

Sep. 30, 2004—Invention Disclosure Agreement No. 04-342—Nick Miller—Disc Type Emergency Brakes.
Nov. 17, 2004—Idea Disclosure Agreement No. 05-125—Buddy Weaver—Rear Brake Pad Spreader.
Jun. 25, 2006—Idea Disclosure Agreement No. 06-348—Richard Miller—Rear Disc Brake Spreader.
Sep. 14, 2006—Idea Disclosure Agreement No. 06-474—Jason Jantzen—Caliper Piston Retractor.
Apr. 16, 2009—Idea Disclosure Agreement No. 09-189—Mack Hernandez—Enhanced Speedy Brake Pad Spreader.
Sep. 27, 2011—Idea Disclosure Agreement No. 11-410—Michael DiSciullo—Brake Piston Caliper Push-in-and Turn-in Tool.
Lisle catalog, No. 24400 Disc Brake Pad Spreader, p. 4 (Date unknown, but prior to the present application).
California Tool Co. catalog, K-D Disc Brake Pad Spreader, No. 2145, Section 63, p. 760 (Date unknown, but prior to the present application).
California Tool Co. catalog, OTC Disc Brake Pad Spreader, No. 7034, Section 63, p. 760 (Date unknown, but prior to the present application).
California Tool Co. catalog, K-D Disc Brake Pad Spreader, No. 3376, Section 63, p. 760 (Date unknown, but prior to the present application).
California Tool Co. catalog, ATD Tools, Disc Brake Pad Spreader, No. 5050, Section 63, p. 761 (Date unknown, but prior to the present application).
California Tool Co. catalog, Cal-Van Disc Brake Pad Spreader, No. 702, Section 63, p. 761 (Date unknown, but prior to the present application).
California Tool Co. catalog, Rimac, Disc Brake Pad Spreader, No. 0096, Section 63, p. 761 (Date unknown, but prior to the present application).
A & E Tools, products brochure, Part No. 145, Ford Dual Piston Caliper Retractor, p. 4, (Date unknown, but prior to the present application).
A & E Tools, Part No. 135, GM W-Car Front Piston Retractor, p. 24 (Date unknown, but prior to the present application).
Cal-Van Tools, Speciality Tool Part No. 700, Universal Disc Brake Pad Spreader, Jun. 2000.
Blue-Point, Model BT350, Dual Piston Brake Press Instructions, May 2002.
Invention Disclosure Agreement by Akira Iijima, Brake Caliper Piston Spreader dated Apr. 30, 1996.
Invention Disclosure Agreement by Louis J. Garcia, Dual Piston Brake Caliper Compressor dated May 9, 2000.
Invention Disclosure Agreement by Jeff Wedekind et al., Disc Brake Spreader dated Feb. 8, 2001.
Invention Disclosure Agreement by Hashmat Rahimi, Dual Piston Brake Pad Spreader dated Feb. 12, 2001.
Invention Disclosure Agreement by Robert Dunum, Brake Single or Dual Piston Pushing Tool dated Apr. 17, 2001.
Invention Disclosure Agreement by Marshall A. Green, Disc Brake Pad Spreader dated Jun. 29, 1995.
Invention Disclosure Agreement by Bernard H. Miller, Disc Brake Pad Spreader dated Mar. 18, 1995.
Invention Disclosure Agreement by Juan Lopez, Disc Brake Pad Spreader dated Jun. 18, 1997.
Invention Disclosure Agraeement by Joe Barallon, Tool for Seating Piston on Disc Brake Caliper dated Jul. 9, 2000.
Invention Disclosure Agreement by Dal Sirany, Brake Caliper Piston Retraction Tool dated Dec. 5, 2000.
Invention Disclosure Agreement by George Gonzalez, Disc Brake Pad Spreader dated Aug. 16, 2001.
Invention Disclosure Agreement by Marlon Sampang, Brake Caliper Tool for Trucks dated May 19, 1997.

(56) References Cited

OTHER PUBLICATIONS

Invention Disclosure Agreement by James Ratchovsky, Hydraulic Disc Brake Caliper Piston Retractor Tool dated Feb. 11, 2002.
Idea Disclosure Agreement by Timothy Patrick Hough, Automotive Brake Caliper Spreader for use with 1-6 Pistons dated Feb. 13, 2006.
Idea Disclosure Agreement by Thomas Kobel, Brake Caliper Piston Compressor dated Jul. 14, 2008.
Idea Disclosure Agreement by Aaron Leftnick, Dual and Quadruple Brake Caliper Piston Depressor dated Mar. 24, 2009.
Idea Disclosure Agreement by Oscar L. Jimover, Brake Caliper 406 Caliper Pistons dated May 4, 2009.
Idea Disclosure Agreement by Benjamin J. Whisler, Brake Caliper Piston Compression Tool dated Jul. 13, 2009.
Idea Disclosure Agreement by Lance Lotspeich, Brake Caliper Spreading for Opposed Piston Calipers dated Sep. 11, 2009.
Idea Disclosure Agreement by Matt Hodges, Brake Tool for Four Piston Disc Brakes dated Feb. 9, 2010.
Snap-On, Press, Brake Caliper, Stock #BTCP1, http://buy1.snapon.com/catalog/item.asp?store=snapon-store&item_ID=88695&group_ID . . . dated Jan. 22, 2011.
BK Rider Brake Pad Disc Spreader (3808-0007); http://www.amazon.com/Rider-Brake-Disc-Spreader-3808-0007/dp/B008NYBKD6/ref=s . . . Nov. 14, 2012.
OTC Motorcycle Brake Caliper Spreader—OTC4743; http://www.amazon.com/OTC-Motorcycle-Brake-Caliper-Spreader/dp/B0051XC0FY/ref . . . , Nov. 14, 2012.
SPX/OTC, "Tools and Equiment for the Professional", May 1998, A-98 Catalog, Disc Brake Pad Spreader, No. 7034, p. 70.
International Search Report for corresponding application No. PCT/GB2013/050480 filed Feb. 27, 2013; Mail date Jun. 10, 2013.
Written Opinion for corresponding application No. PCT/GB2013/050480 filed Feb. 27, 2013; Mail date Jun. 10, 2013.
British Search Report for corresponding application GB1222039.8; Dated Mar. 8, 2013.
International Preliminary Report on Patentability for corresponding application PCT/GB2013/050480 filed Feb. 27, 2013; Report dated Sep. 9, 2014.
Speedy Brake Piston Wind-Back Tool, Cust# FR0043, Frenway Products, Inc., Nov. 21, 2014.
Brake Piston Spreader, No. 5543, http://www.lasertools.co.uk/itrm.aspx?cat=1259&item=10867 dated Aug. 14, 2015.

\* cited by examiner

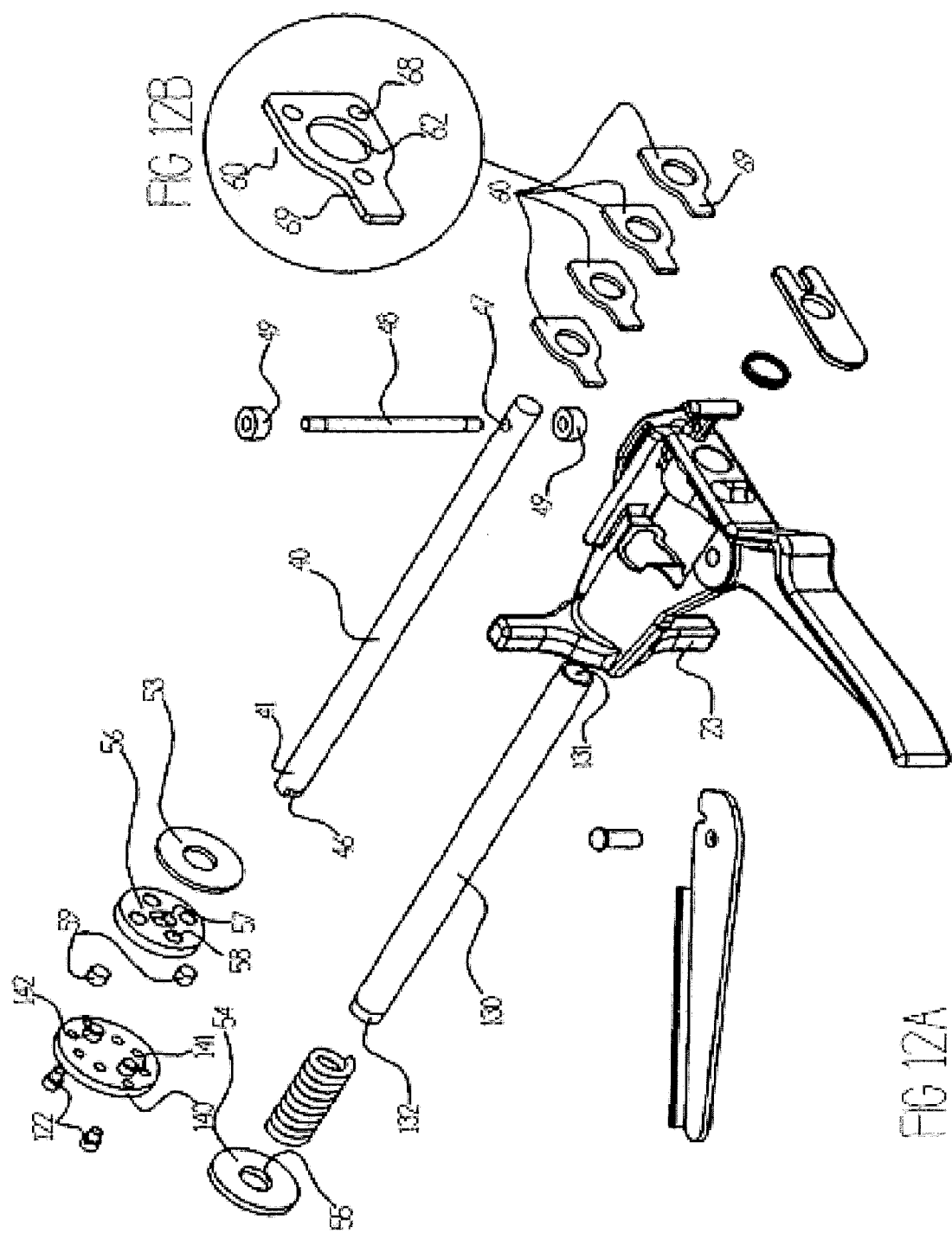

BRAKE PAD SPREADER TOOL

FIELD OF THE INVENTION

The present invention relates to a hand held tool used for spreading apart brake pads.

BACKGROUND TO THE INVENTION

It is known to provide hand held brake pad spreader tools having disc a retractable piston. Retraction of the piston can be pneumatic via a threaded shaft that when utilised pushes the piston back into its bore (see for example. Blake U.S. Pat. No. 6,195,863 or Markous U.S. Pat. No. 5,018,261). These tools are either expensive or extremely slow.

A further example of what is termed a brake pad spreading tool has a pair of plates which are offset from the operating mechanism and which are pushed apart by a hydraulic mechanism (see for example Ratchovsky U.S. Pat. No. 6,378,185). If the piston has much resistance (caused by dry seals, corrosion or foreign matter), the plates will deform and exert uneven pressure on the piston face causing further resistance.

Another example is shown in Miller U.S. Pat. No. 7,155, 792 which uses a toothed rod and a hand operated ratchet mechanism in a similar way to the mastic gun of Kelsey GB 782365. The hand tool of U.S. Pat. No. 7,155,792 consists of a shaft having a ram affixed onto a front end that slidably extends through a central aperture in a frame member and a central through bore in a backing plate that is mounted to a forward end of the frame member. A trigger handle is pivotally affixed to the frame member adjacent to a depending fixed handle on the frame member. A mechanism is for moving the shaft forwards when the trigger handle is squeezed towards the fixed handle by a hand of a person. A mechanism is for holding the shaft stationary thereby preventing the shaft from moving backwards when the trigger handle is released. Such tools work on the face of the caliper piston which can result in the piston seal being destructively pinched between the caliper housing and the tool "ram" as the piston is fully retracted.

In general, rear brake calipers incorporating "hand brake" type mechanisms have wind forward type mechanisms to allow for the wear of the material of the disc pad. These need to be wound back to allow for insertion of fresh disc pads having greater thickness of the material. These wind back mechanisms have either clockwise or anti-clockwise threads and the tools required to operate them are of two separate types; clockwise or anti-clockwise thread types.

It is recognised that a superior tool which can be used on several sizes and types of caliper piston and which is less expensive to manufacture is desired.

SUMMARY OF THE INVENTION

According to a first aspect of the invention, there is provided a hand held brake pad spreader tool for use with a brake caliper of the kind having a sliding caliper body supporting an opposed pair of brake pads arranged to sandwich a brake disc and a piston for clamping the brake pads against the brake disc, the tool comprising:
 a body;
 a handle on the body;
 an abutment on the body for engaging the caliper body;
 an elongate member supported by the body for longitudinally sliding movement relative thereto;
 a manually actuable moveable member supported on the body adjacent to the handle;
 drive means coupled between the moveable member for moving the elongate member longitudinally, the arrangement being such that the elongate member is arranged for driving engagement with the piston when the abutment is in engagement with the caliper body to move the piston to spread brake pads apart,
 characterised by piston engagement means on the elongate member arranged for driving engagement with the piston and mounted for free rotation both clockwise and anticlockwise, and by means for rotating the piston engagement means.

The present invention thus defines a brake pad spreader tool (brake caliper tool) for use on brake caliper assemblies having a caliper housing providing a piston receiving bore, in which a piston is reciprocally disposed. In such calipers, the bore is open at one end and closed at its opposite end, and an outboard brake pad support bracket is spaced axially apart from the open end. The support bracket has an opening therethrough generally aligned with the bore. The piston is predominantly a hollow cylindrical piston with a first closed end adjacent the closed end of the bore and a second open end adjacent the open end of the bore. The invention provides a hand held tool for the retraction of the disc brake caliper piston. The invention may comprise a body comprising of a moulded frame or a frame which can be stamped from sheet metal with parts press formed into a partial through bore for the retaining of an elongate member or shaft within the frame.

The manually actuable movable member may comprise a lever, for example in the form of a trigger.

In some embodiments, a pistol type grip handle is preferably incorporated into the frame and a trigger pivotally mounted to the frame so as to co-operate with the handle. The drive mechanism couples the trigger to the shaft in order to drive the shaft forward when the trigger is squeezed. There may also be a resilient mechanism for uncoupling the drive mechanism from the shaft when the trigger is released. The same resilient portion is usefully employed to reposition the trigger ready for its next operation. Through repeated operations the shaft can be propelled forward out from the frame.

The frame may have an abutment in the form of cross members attached to its foremost portion. In use, the cross members are positioned such as to abut the inner surface of the brake caliper outer brake pad support bracket; the frame of the brake caliper tool is positioned through the gap in the outer brake pad support bracket "ears" and the shaft or rod is propelled inwards until a ram (piston engagement means) on the rod end abuts the brake caliper piston inside back wall. The brake caliper tool shaft is in alignment with the actuated brake piston. Actuation of the trigger projects the rod and therefore the ram outwards from the frame. As the cross members are robustly attached within the frame and the brake pad support bracket solidly forms part of the brake caliper/piston housing the brake caliper piston can be pushed back into its cylinder with considerable force in a robust manner. In order to remove the tool after use the trigger is relaxed and, if fitted, a secondary ratchet lock may be released. The proximal end of the shaft which preferably has a handle formed or attached is pulled in order to disengage the rain enough to provide for ease of removal.

The drive means may comprise at least one gripping member arranged for frictional contact with the elongate member. The drive means may comprise an array of gripping members. The array of gripping members may be formed with protrusions whereby the gripping members are spaced apart.

In a further embodiment the brake caliper tool drive mechanism incorporates a plurality of gripping members in the form of washer grippers. In use when the trigger is compressed the trigger pivots around its axis pin mounted upon the frame, the trigger levered end coming into contact with an off center point of the washer grippers such that the gripper is cantered against its resilient member. The inner diameter of the washer may be slightly larger than the outer diameter of the shaft through it, the opposed edges of the washer opening tending to bite into the surface of the shaft. Due to the extreme force that may be required to actuate the brake caliper tool and thereby push back the worked brake piston, the more washer grippers utilised the less damage incurred by the washers grip upon the shaft. As the grip ratio of the washers upon the shaft is also improved the shaft material can now be further improved and or hardened further enhancing the wear characteristics of the shaft prolonging the life cycle of the device.

In a further embodiment of the previous example of the brake caliper tool as the gripping washers when stamped invariably have a slight "edge" or burr and as such can catch on one another when stacked then cantered. The use of a further thin shim like washer having a far lesser circumference than the gripping washer and the further use of a self-lubricating or slippery material obviates this problem. In a further embodiment of the previous example of the brake caliper tool the metal gripping washers have protrusions stamped or mounted around the periphery of their through hole in order to obviate the requirement of shim type washers.

A clamping member may be arranged between the at least one gripping member and the elongate member.

The piston engagement means may be detachably mounted on the elongate member.

For example, magnetic means may be used for retaining the piston engagement means on the elongate member. The piston engagement means may comprise an array of pin bores for receiving driving pins adapted to engage in corresponding bores in the piston. In this way, the piston engagement means may be adapted for use with a plurality of different sizes.

The piston engagement means may comprise a member rotatably mounted on the elongate member. The piston engagement means may comprise a portion adapted for driving engagement with a spanner or the like whereby the piston can be rotated. Alternatively, the piston engagement means may be coupled to the elongate member for rotation therewith, and wherein the elongate member is provided with means for rotating the elongate member. The means for rotating the elongate member may comprise a manually actuable lever projecting from the elongate member. The tool may comprise a tube mounted in the body and arranged for longitudinal movement therein, the elongate member being mounted in the tube for rotation therein and for longitudinal movement therewith, the drive means being arranged for driving engagement with the tube.

The brake caliper tool can be further utilised in order to operate brake caliper pistons of the wind back type which need to be rotated whilst being pushed back into the piston bore. In one embodiment, the ram utilises a further detachable outer cylinder with an array of pin attachment holes on its piston abutment surface. The outer surface of the cylinder preferably has an array of flats around its periphery for the turning engagement by similar sized wrenches or such like.

Insertion of suitable pins by known means into the pin attachment holes that correspond in orientation to that of the engagement holes in the caliper piston pad abutting surface, usefully gives a means of turning the caliper piston whilst the required inwards pressure is applied by the manipulation of the tool trigger.

In another embodiment of the present invention, the brake caliper tool may be utilised in order to operate brake caliper pistons of the wind back type. In this further version the shaft is contained within a tube, in order that the shaft can be rotated within the tube whilst the tube is propelled forward. The shaft is gripped and released in the same way as the shaft was operated previously. The shaft has a bar or the like fitted through its distal end in order to turn the shaft as required. Turning the shaft also turns the wind back piston via an adaptor plate. The ram end of the shaft has a flange fitted and secured to the shaft by interlocking profiles and welding or the like. The flange has pins or recesses for connection to the detachable wind back piston engagement adaptor plate. The ram end of the tube also has a flange fitted to co-operate with the shaft flange in order to purposefully project the ram outwards from the tool when operated as required. In order to minimise the friction imparted by any rotational movement of the shaft flange against the tube flange abutting surfaces a low friction material washer or the like can usually be employed between their interfaces.

In a further embodiment of the previous example of the brake caliper tool, the shaft within the tube can be usefully rotated in both the clockwise and anti-clockwise direction whilst any required forward pressure can be imparted by the utilisation of the trigger mechanism. Thus in contrast to the prior art tools which were designated as either clockwise or anti-clockwise mechanism type tools, a substantial saving is incurred.

In a further embodiment of the previous example of the brake caliper tool, instead of a bar being used in order to rotate the shaft, a hexagonal or other profile is employed to allow for rotation by a wrench, ratchet drive or similar.

In a further embodiment the brake caliper tool has a layer of low friction material or thrust bearing usefully employed between the ram on the distal end of the shaft, and the inner base of the ram outer cylinder in order to minimise any turning force transmitted to the ram/shaft when the outer cylinder is rotated.

In a further embodiment of the brake pipe caliper tool, the device preferably has an elongated handle and trigger in order to provide superior leverage to the rod or shaft in order to propel the shaft with an enhanced force.

In a further embodiment of the brake pipe caliper tool, the tool optionally has a shaft or rod of square section and the inner diameter of the gripping washers are of a similar but slightly larger profile. In order to further reduce the inherent scoring, pitting or indenting prevalent in such a locking mechanism there is further provided clamping strips positioned between the rod and the plurality of gripping washers. In use the gripping washers impart a clamping action upon the shaft via the clamping strips. The surface of the clamping strips adjoining the shaft surfaces can further usefully be of a friction material in order to enhance the grip imparted without incurring surface damage to the rod.

In a further embodiment of the brake pipe caliper tool, the tool preferably has a further elongate gripping washer and resilient member positioned as a one way frictional locking mechanism. This additional mechanism or withdrawal switch services to prevent any undue shaft back movement as the main locking mechanism's grip upon the shaft is released during the repositioning sequence. This withdrawal switch requires to be activated in order to withdraw the shaft when removing the device from the operated caliper.

In a further embodiment, the abutment may be rotatable on the body. The abutment may be detachable from the body. The tool may further comprise means locking the abutment on the body in a desired position. The tool can thus be used in various different orientations. The abutment may comprise an opposed pair of members, e.g. cross members. Where the abutment is detachable, the abutment may comprise a pair of members and means on the body for fixing the members thereto. In the fixed position, the members may project in opposed directions from the body While one or more preferred embodiment of the preferred invention has been described above, it should have been understood that any and all equivalent realisations of the present invention are included within the scope and spirit thereof. The embodiments depicted are presented by way of example only and are not intended as limitations upon the present invention. Thus, it should be understood by those of ordinary skill in the art that the present invention is not limited to these embodiments since modifications and be made. Therefore, it is contemplated that any and all such embodiments are included in the present invention as may fall within the scope of appended claims.

BRIEF DESCRIPTION OF THE DRAWINGS

A full and enabling disclosure of the present invention including the best mode thereof, directed to one of ordinary skill in the art, is set forth in the specification, which makes reference to the appending drawings in which:

FIG. 12a is a perspective view of an alternative brake pad spreader tool with the parts shown dismantled;

FIG. 12b shows adapted components of the brake pad spreader tool of FIG. 12a;

FIG. 13b is a side view of part of the tool of FIG. 13a;

FIG. 14b shows the components of FIG. 14a.

DETAILED DESCRIPTION OF THE DRAWINGS

Figure 6:
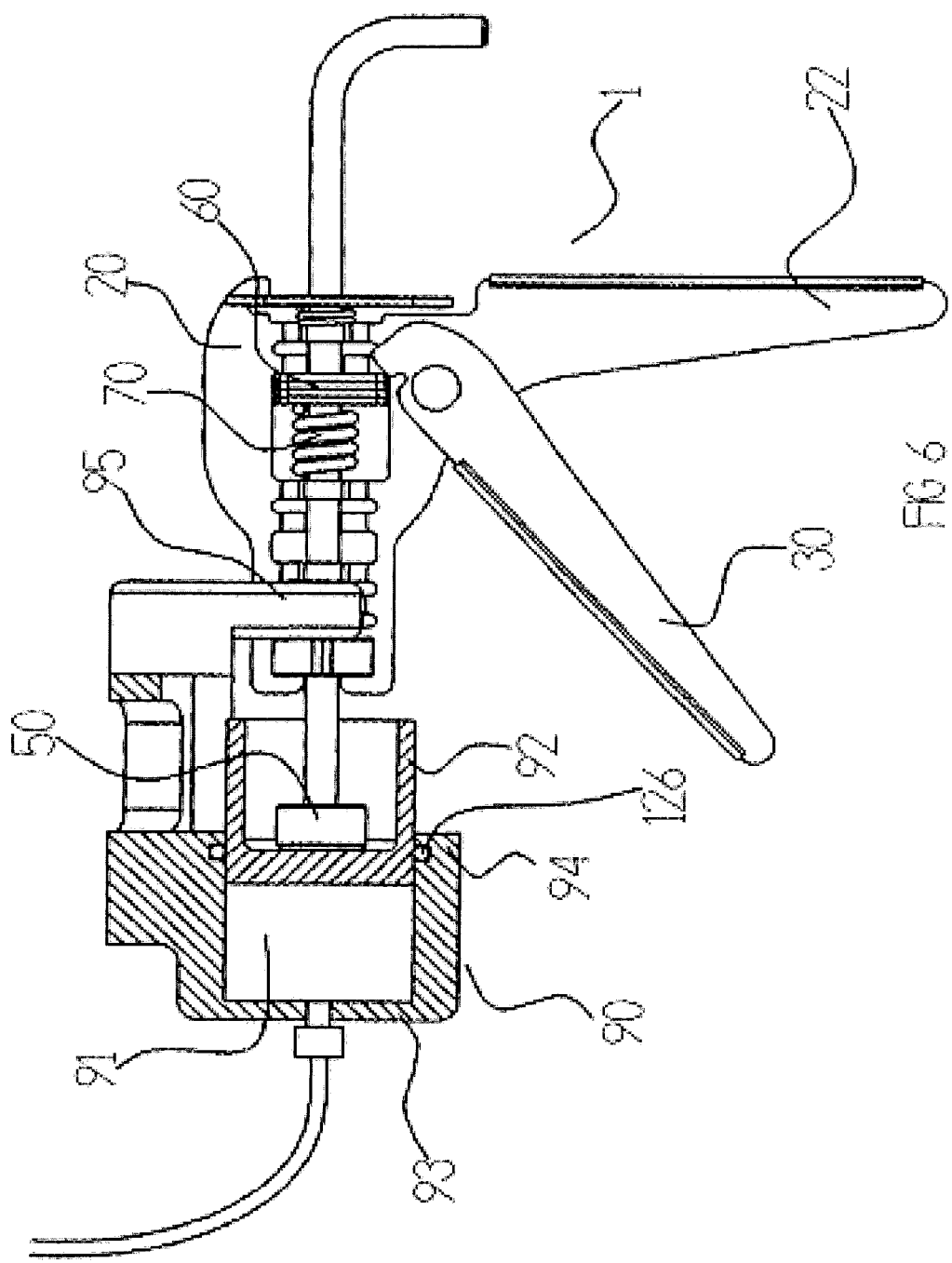
FIG. 6 shows a cross-section of the brake caliper engaged with the brake pad spreader tool of FIG. 2.
Figure 7:
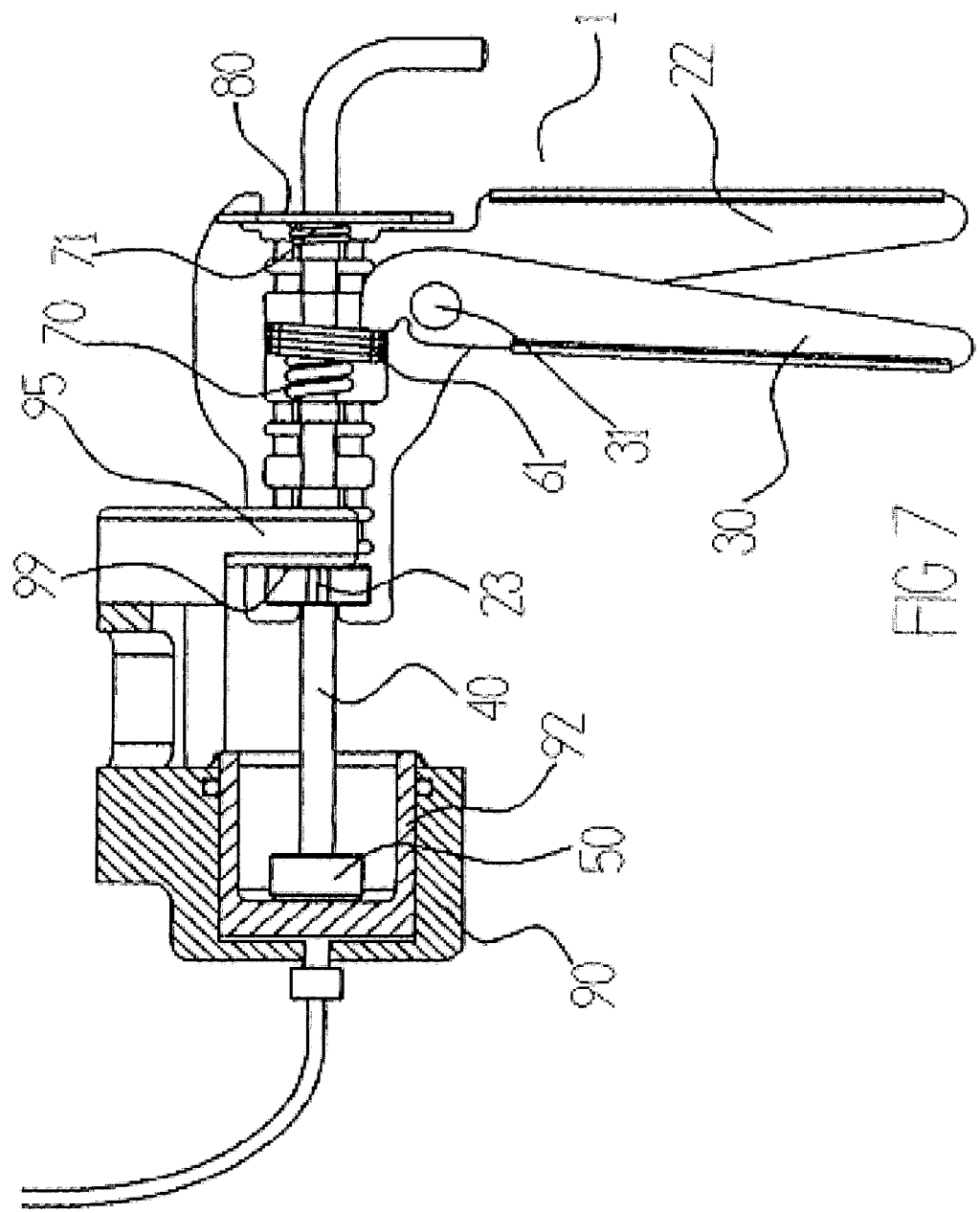
FIG. 7 shows a cross-section of the brake caliper engaged with the brake pad spreader tool of FIG. 4.

FIGS. 1 to 7 show a hand held brake pad spreader tool or brake caliper tool 1 for use with a brake caliper 90. As shown in FIGS. 6 and 7, the brake caliper is of the kind having a sliding caliper body supporting an opposed pair of brake pads (not shown) arranged to sandwich a brake disc (not shown) and a piston 92 for clamping the brake pads against the brake disc.

The brake caliper tool 1 provides a hand held tool for the retraction of the piston 92. The brake caliper tool 1 comprises a body which is in the form of a frame 20 which may be moulded of stamped from sheet metal. The frame comprises a partial through bore 21 for retaining an elongate member or shaft 40 with the frame 20. The shaft is thus supported by the frame for longitudinally sliding movement relative thereto. A pistol type grip handle 22 is preferably incorporated into the frame 20 and a manually actuable moveable member or trigger 30 is pivotally mounted by a pivot pin 31 to the frame 20 adjacent the handle 22.

The tool 1 also comprises a drive mechanism 60 which in this embodiment comprises at least one gripping member in the form of a washer type gripper 61. There are preferably a plurality of said grippers 61 in order to lessen the wear of the shaft 40 whilst providing superior grip when driving the shaft forwards. As shown in FIG. 5a, each gripper 61 has an opening 62 having a diameter which is slightly larger than a diameter of the shaft 40 so that the gripper 61 is freely slidable on the shaft 40 when each gripper 61 is arranged generally perpendicular to the shaft.

Figure 4:
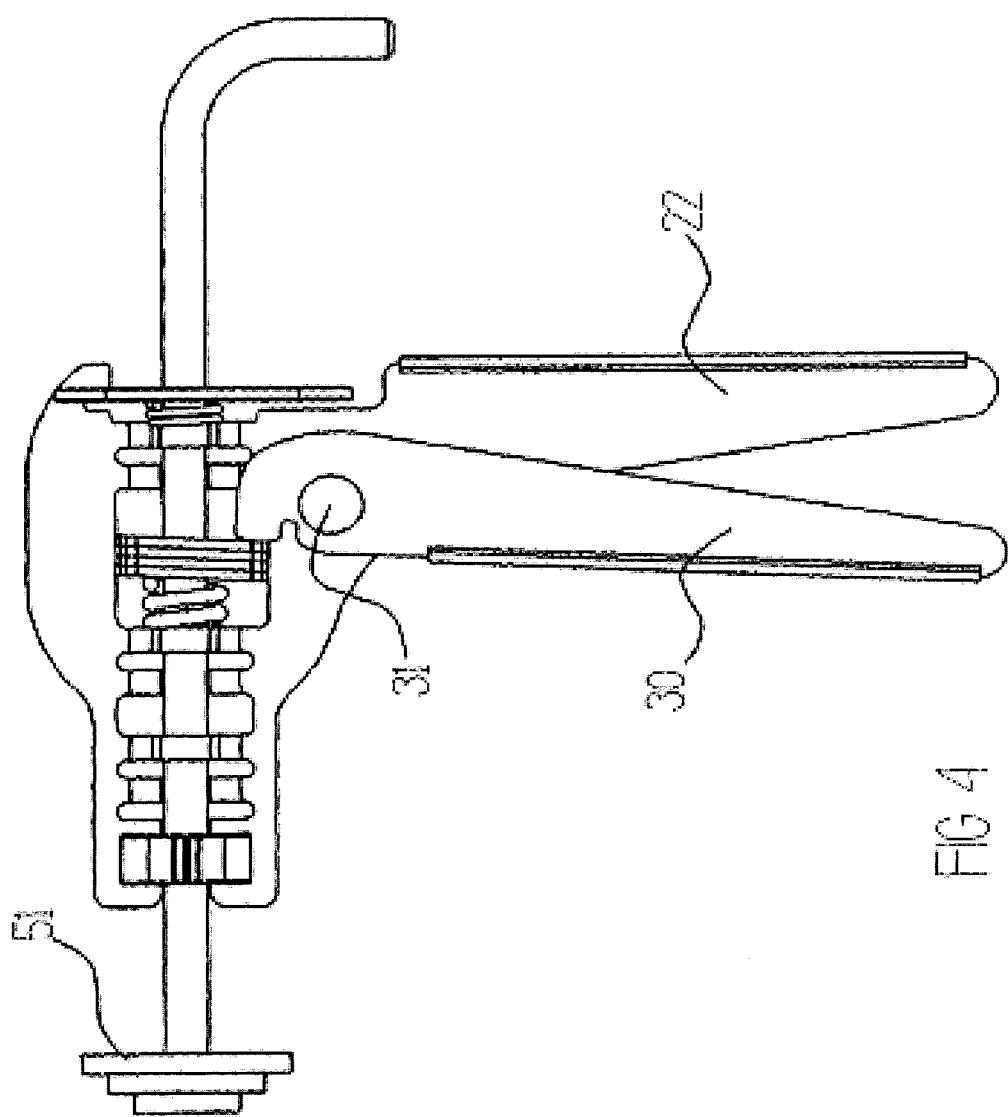
FIG. 4 is a side view of the brake pad spreader tool of FIG. 1 in an activated position.
Figure 5:
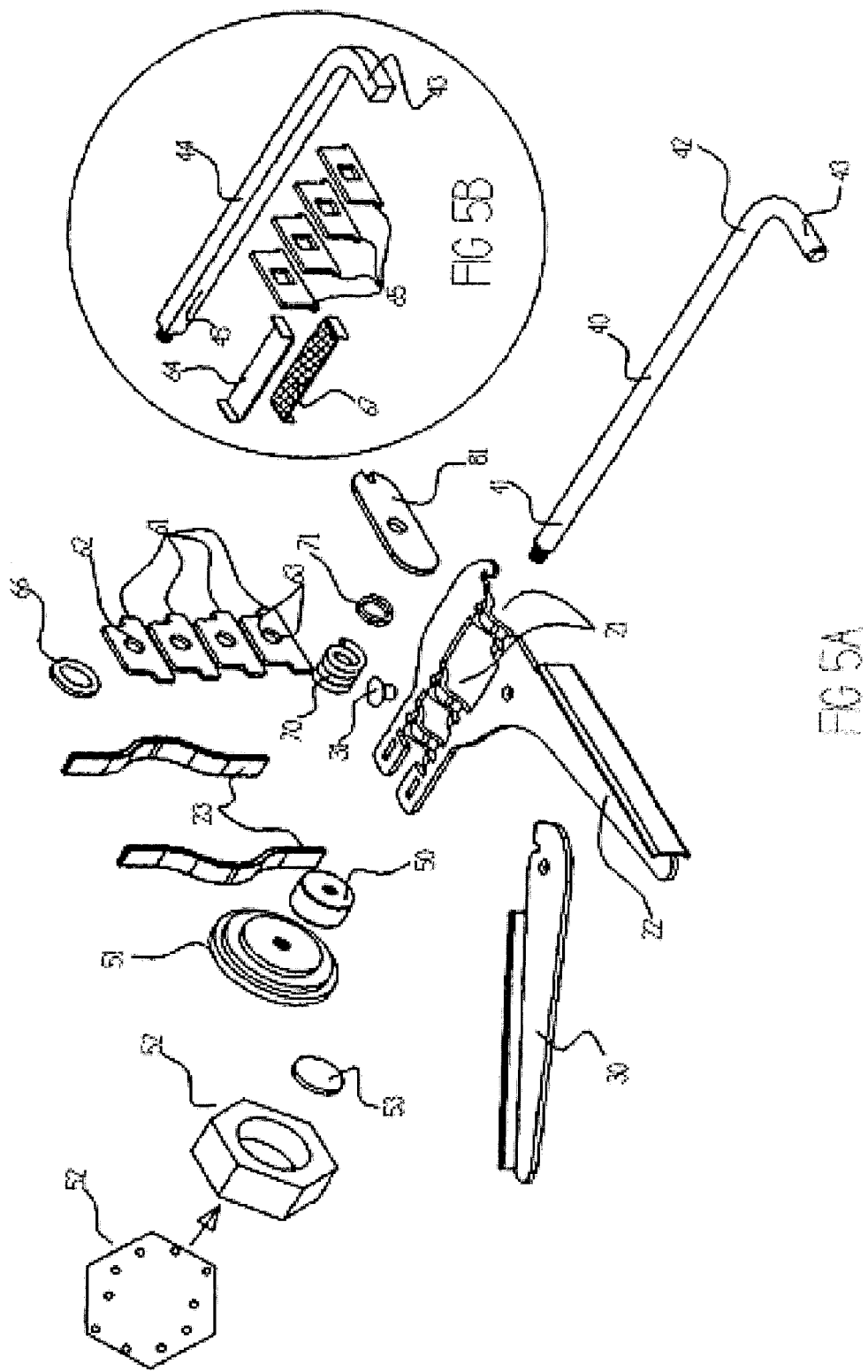
FIG. 5a is a perspective view of the brake pad spreader tool of FIG. 1 with the parts shown dismantled.
FIG. 5b shows components of the brake pad spreader tool of FIG. 5a adapted for a square shaft.

The drive mechanism 60 is activated by rotation of the trigger 30 relative to the handle which brings a levered end 32 of the trigger 30 into contact with the grippers 61 at an off centre point of the washer grippers. The trigger thus acts as a lever and as shown in FIG. 4, activation of the trigger 30 causes the grippers 61 to be cantered (i.e. set at an angle to the shaft) which causes the opposed inside edges 63 of the openings 62 to tend to "bite" into the outer surface of the shaft 40. Thus, the grippers are arranged for frictional contact with the shaft. This provides robust forward action of the shaft 40. The use of cantered grippers means that a larger surface area of the grippers is in contact with the shaft and thus less damage is incurred by the washers on the shaft. The grip ratio of the grippers on the shaft is also improved so the shaft material can be improved and/or hardened. This further enhances the wear characteristics of the shaft prolonging the life cycle of the device.

The tool 1 also comprises a resilient member 70 which in this example is a compression spring and which uncouples the drive mechanism 60 when the trigger 30 is released. A distance piece or spacer 66 is arranged between the resilient member 70 and the gripper 61. The resilient member 70 will also reposition the trigger 30 ready for its next operation. Thus, the trigger and drive mechanism are biased in a retracted position. Through repeated operations of the trigger 30, the shaft 40 can be propelled forward out from a foremost portion 24 of the frame. Cross-members 23 are attached to the foremost portion 24 of the frame.

More detail of the brake caliper is shown in FIGS. 6 and 7. The brake caliper comprises a caliper housing providing a piston receiving bore 91 in which the piston is reciprocally disposed. The bore 91 is open at one end 93 and closed at its opposite end 94. An outboard brake pad support bracket 95 is spaced axially apart from said open end 93. The support bracket 95 has an opening 96 therethrough generally aligned with the bore 91. The piston 92 is a hollow cylindrical piston with a closed first end 97 adjacent the closed end 93 of the bore and a second open end 98 adjacent the open end 94 of the bore.

When the brake caliper tool is engaged or in use with the brake caliper, the foremost portion of the frame 20 of the brake caliper tool is positioned through the opening 96 between the support bracket 95. The cross members 23 are positioned such as to abut an inner surface 99 of the support bracket 95 of the brake caliper 90. Thus the cross members form an abutment which engages with the caliper body.

Figure 1:
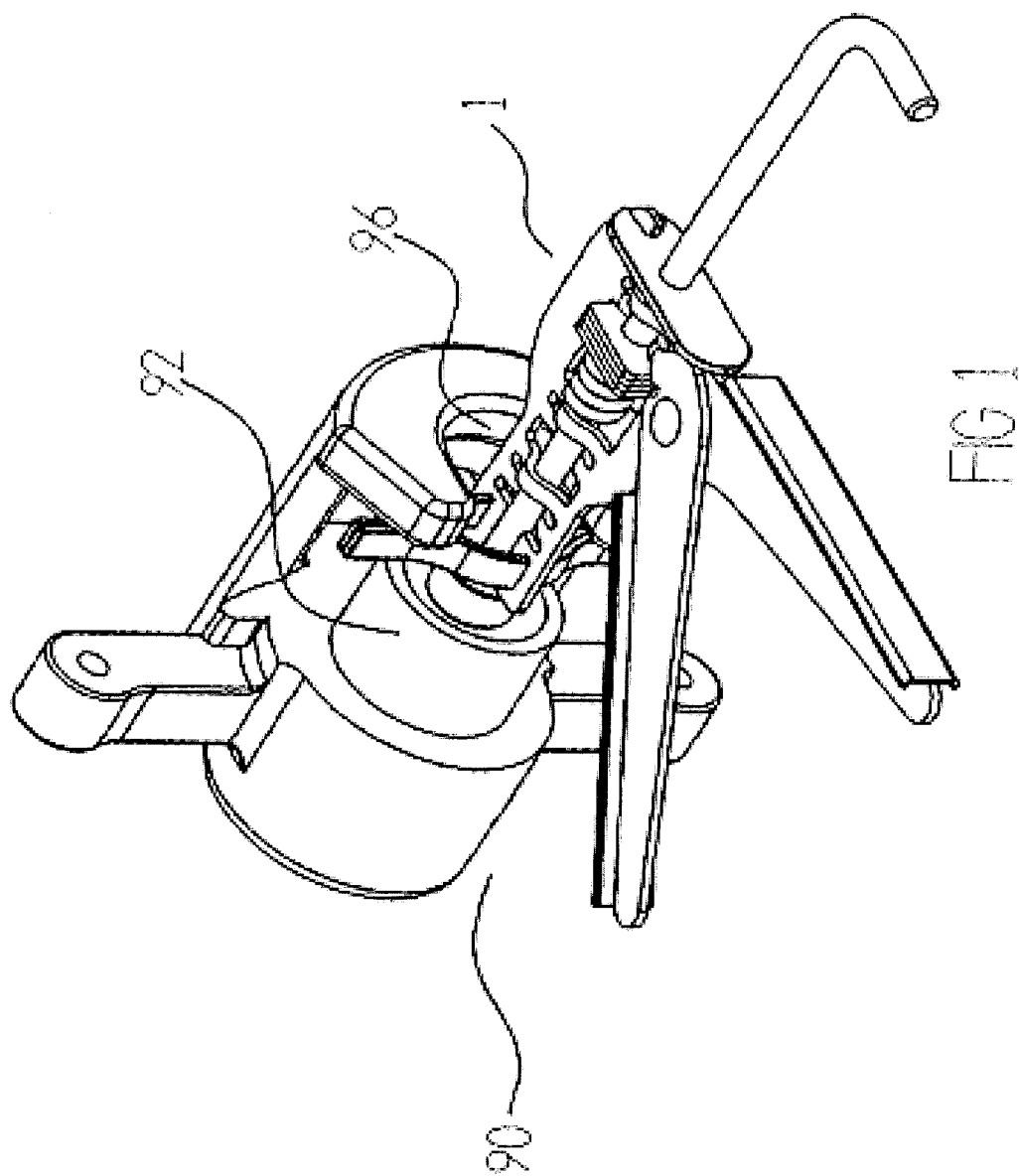
FIG. 1 is a perspective view of a brake pad spreader tool engaged upon a brake caliper.
Figure 2:
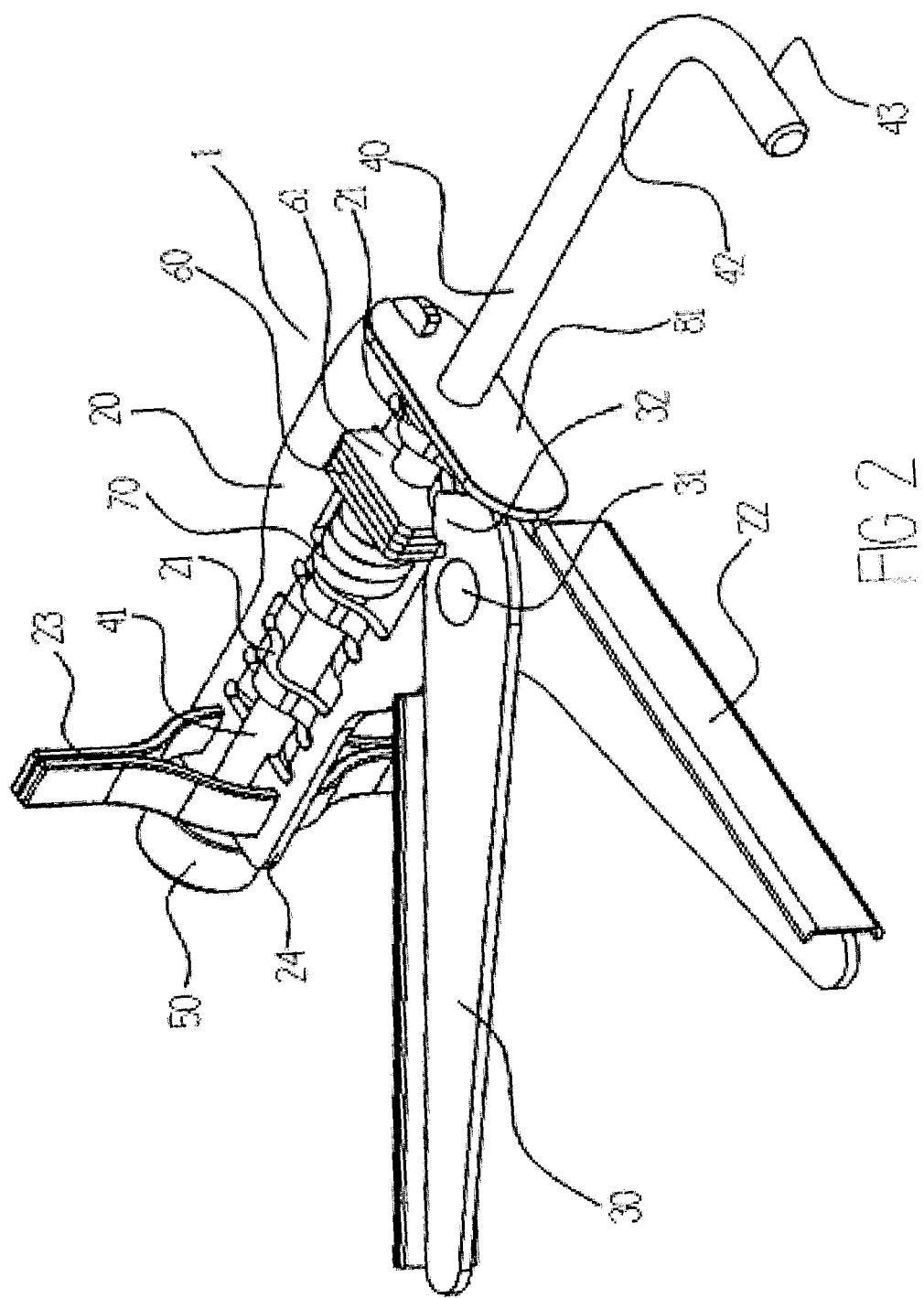
FIG. 2 is a perspective view of the brake pad spreader tool of FIG. 2 in a fully retracted position.

The shaft 40 has a ram 50 at one end. The ram may be generally cylindrical as shown in FIG. 2 or the ram 51 may have a stepped configuration as shown in FIG. 4. Both configurations are shown in FIG. 5a. A cylindrical ram may be arranged to fit within an open piston whereas a stepped ram may have a larger diameter than the piston. Activation of the trigger 30 projects the shaft 40 forwards until the ram 50 on the shaft end abuts the piston. In one embodiment, the ram 50 may abut an inside face of the closed end 97 of the piston. Alternatively, for example with the stepped configuration, the ram 51 may engage the open end 98 of the piston. In all embodiments, the brake caliper tool 1, in particular its shaft 40, are in alignment with the piston 92.

Actuation of the trigger 30 projects (i.e. moves longitudinally) the shaft 40 and therefore the ram 50 outwards from the frame as shown for example in FIG. 4. The cross members 23 are robustly attached within the frame 20 and the support bracket 95 solidly forms part of the brake caliper. Accordingly, the piston 92 can be pushed back into its cylinder 91 with considerable force in a robust manner. Accordingly, the shaft is arranged for driving engagement with the piston when the cross member (abutment) is in engagement with the caliper body to move the piston to spread the brake pads apart.

Figure 3:
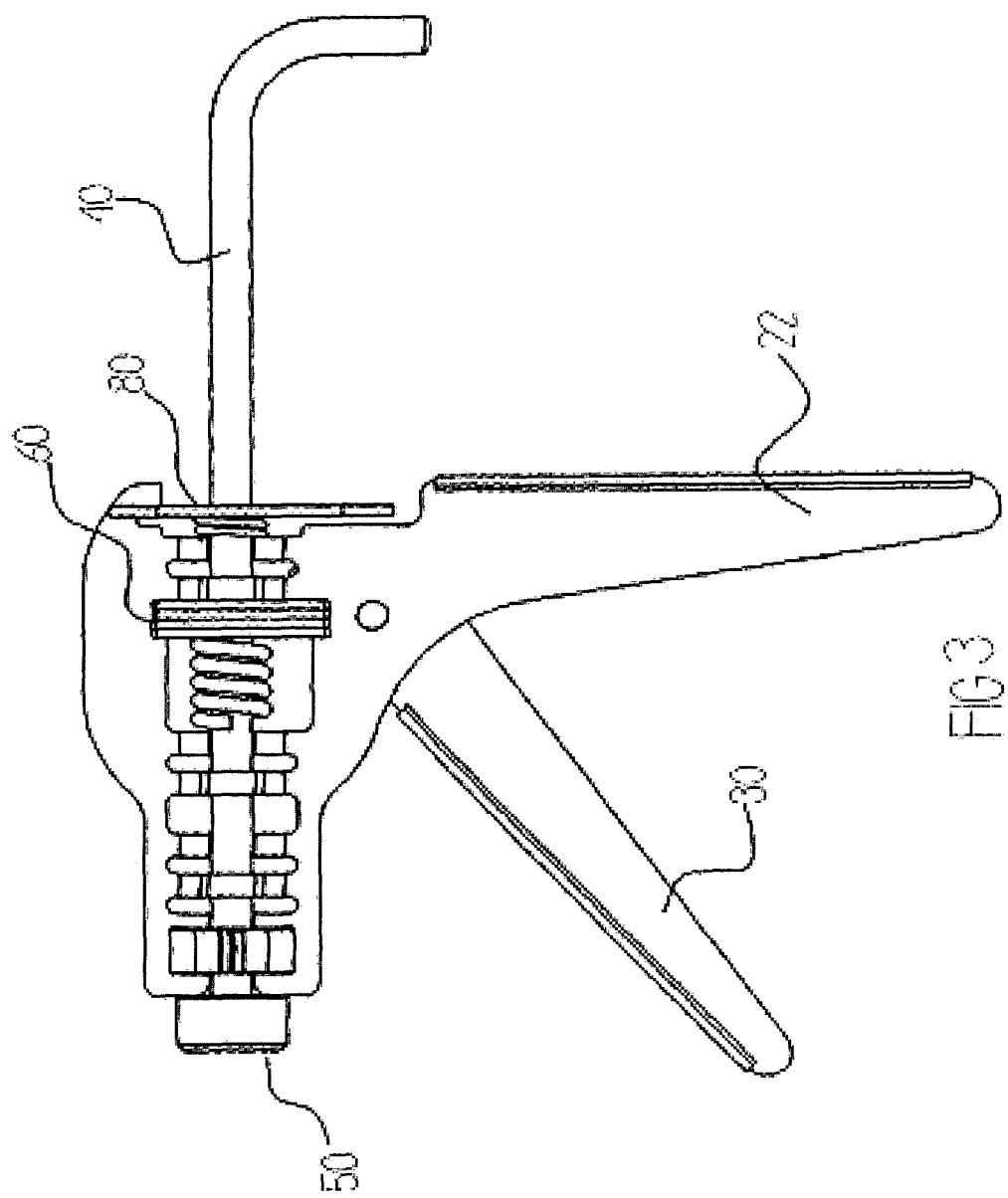
FIG. 3 is a side view of the brake pad spreader tool of FIG. 2.

An optional one way frictional locking mechanism 80 may be incorporated in the tool, e.g. as shown in FIG. 3 with the components shown in FIG. 5a. The locking mechanism 80 comprises an elongate gripper washer 81 and a resilient member 71 (in the form of a spring). This locking mechanism 80 serves to prevent any unwanted rearward movement of the shaft (i.e. movement away from the piston) when the grip of the drive mechanism 60 on the shaft is released. When a user wishes to remove the shaft so as to remove the tool 1 from the operated caliper 90, the locking mechanism 80 must be released. The distal end 42 of the shaft 40 preferably has a handle 43 formed or attached thereto. A user may pull on this handle to disengage the ram 50 from the piston to facilitate removal.

Figure 8:
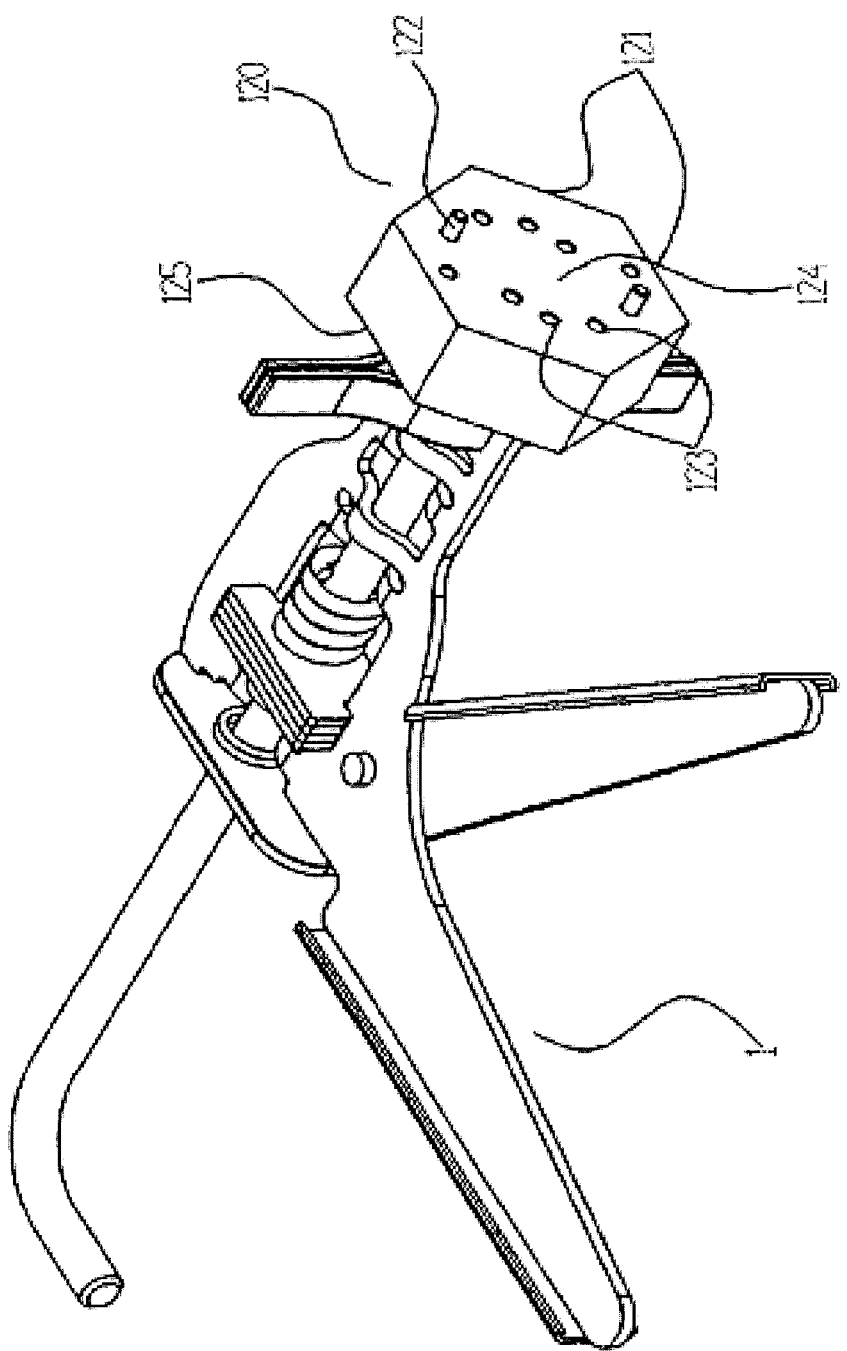
FIG. 8 is a perspective view of a brake pad spreader tool with a detachable outer cylinder.
Figure 9:
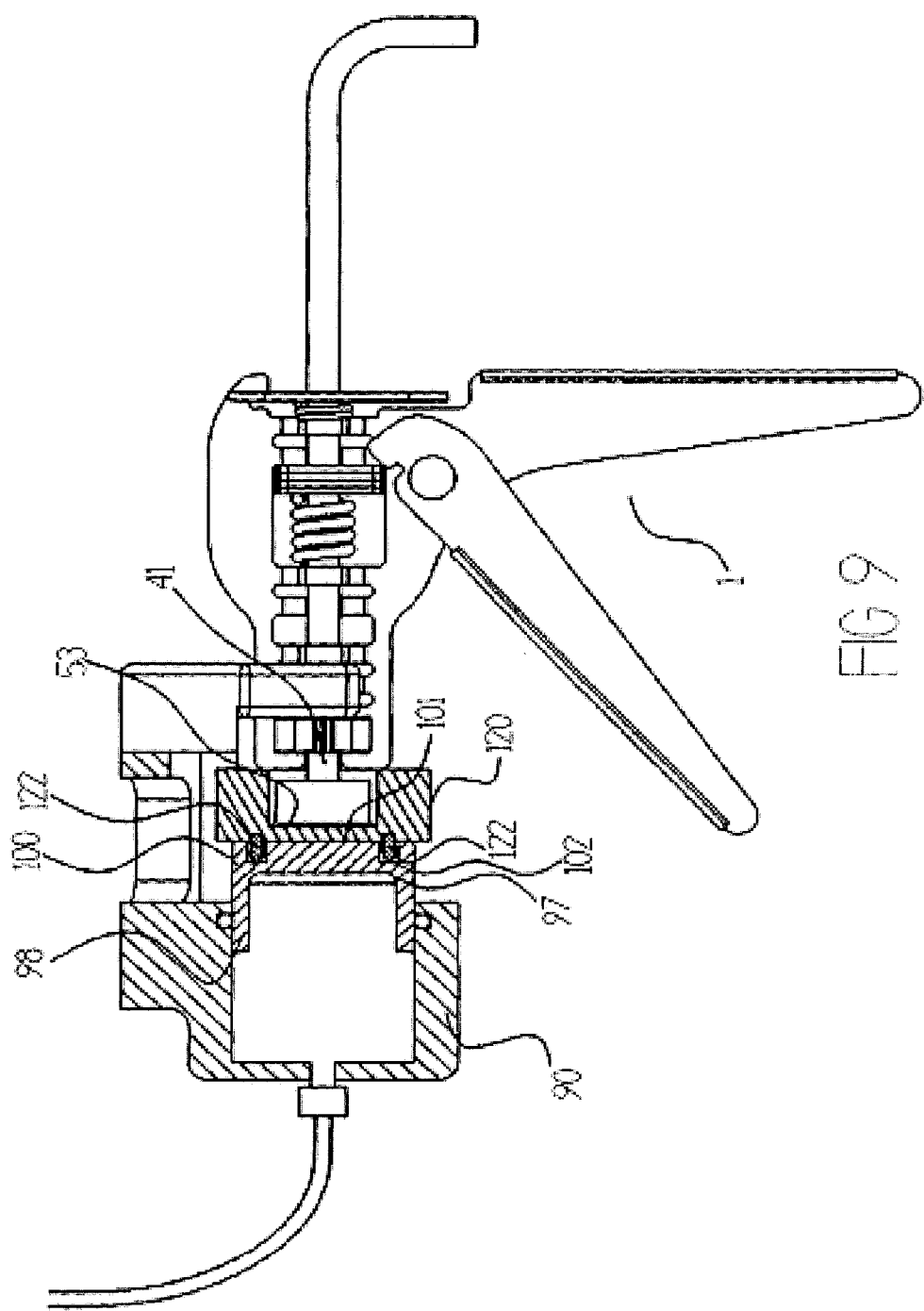
FIG. 9 is a side view of the brake pad spreader tool of FIG. 8 engaged with a brake caliper, the brake caliper being shown in cross-section.

As shown in FIGS. 8 and 9, a further embodiment of the brake caliper tool may be utilised to operate brake calipers having a wind back type of piston 100. Such calipers require the piston to be rotated whilst being pushed back into the piston bore 91. In this embodiment, the ram 50 is mounted within a detachable outer cylinder 120. A similar wind back adaptor 52 is shown schematically in FIG. 5a. Other features of the brake caliper tool are the same as the features described in relation to FIGS. 1 to 7 and are thus not described again in detail. It will be appreciated that the cylinder 120 may be incorporated in all the described embodiments.

The cylinder has an outer circumferential surface 125 which preferably has an array of engagement flats 121 around its periphery for the turning engagement by similar sized wrenches (not shown) or other similar tools. The flats 121 thus provide a portion which is adapted for driving engagement with a spanner or the like whereby the cylinder 120 and hence the piston can be rotated. A low friction thrust type bearing may be used between the abutment surface 124 of the cylinder and the abutment surface of the piston to enhance operation.

The cylinder is adapted so that the tool fits as many different wind back piston type calipers as possible. In use a surface 124 of the outer cylinder abuts a surface 101 of the piston. Thus, the cylinder forms a piston engagement means which is detachably mounted on the shaft. The abutment surface 124 of the cylinder has an array of pin engagement holes 123 into which pins 122 are inserted. Similarly, there are pin engagement holes 102 on the abutment surface 101 of the piston. By correctly positioning the pins in the pin engagement holes 123 on the abutment surface 124 of the cylinder; the pins will correspond to the engagement holes 102 in the piston. The engagement of the pins in the correct pairs of holes gives a means of turning the piston 100 whilst the required inward pressure is applied by the manipulation of the trigger 30.

Figure 10:
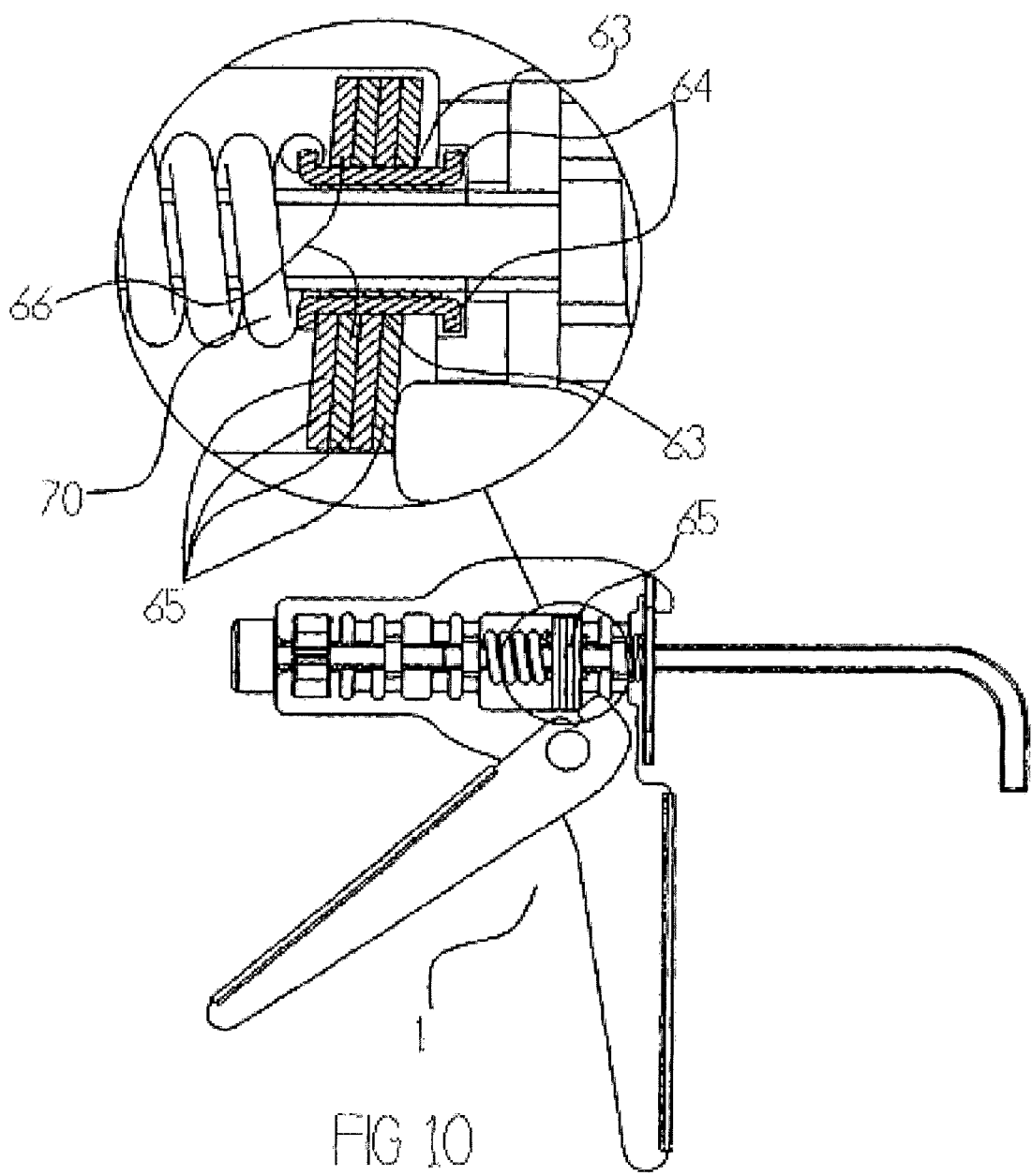
FIG. 10 is an exploded view of a section of the brake pad spreader tool with the square shaft of FIG. 5b.

As shown in FIGS. 5b and 10, in an alternative embodiment of the brake caliper tool, the shaft 44 has a square cross-section. It will be appreciated that the square cross sectional shaft may be incorporated in all the described embodiments. The openings in the gripper washers 65 have a similar but slightly larger square profile. In order to further reduce the inherent scoring, pitting or indenting (not shown) which is prevalent in such a drive mechanism 60, the drive mechanism further comprises at least one clamping member in the form of clamping strips 64. The clamping strips 64 are positioned between the edges of the square shaft 40 and the inner edges 63 of the openings in the gripping washers 65. In use, the gripping washers 65 impart a clamping action on the shaft 44 via the clamping strips 64. The surface of the clamping strips adjoining the shaft surfaces 45 can usefully be made from a friction material 67 in order to enhance the grip imparted without incurring surface damage to the shaft 44.

Figure 11:
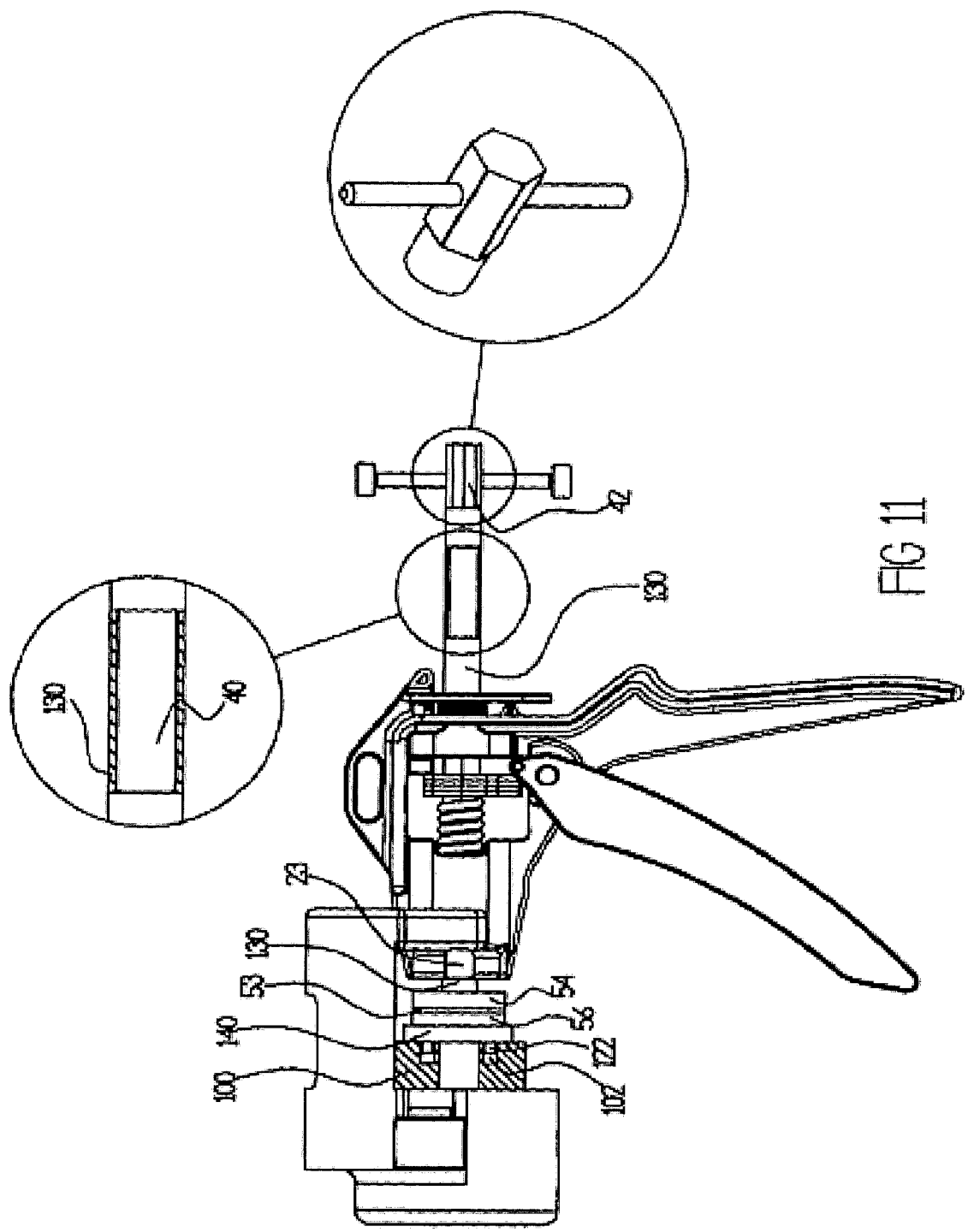
FIG. 11 is a side view of an alternative brake pad spreader tool engaged with a brake caliper which is shown in partial cross-section.

FIGS. 11 and 12a show a further alternative embodiment of the brake caliper tool of FIGS. 8 and 9 which is used to operate brake calipers having wind back type pistons. In this embodiment, the shaft 40 is mounted within a tube 130 for rotation therein whilst the tube is propelled forward. The tube 130 and shaft 40 are moved longitudinally in the same way as the shaft 40 was operated in FIGS. 1 to 7 and thus the drive mechanism, trigger and abutment are not described again in detail.

As in previous embodiments, the shaft 40 has a ram in the form of an adaptor plate 140 at one end. The adaptor plate 140 is similar to the cylinder shown in FIGS. 8 and 9 and is adapted for use with different sized pistons. In use a surface of the adaptor plate abuts a surface of the piston. Thus, the adaptor plate forms a piston engagement means. The abutment surface of the adaptor plate 140 has an array of pin engagement holes 141 into which pins 122 are inserted. Similarly, there are pin engagement holes 102 on the abutment surface of the piston. By correctly positioning the pins in the pin engagement holes 123 on the abutment surface of the adaptor plate 140; the pins will correspond to the engagement holes 102 in the piston. The engagement of the pins in the correct pairs of holes gives a means of turning the piston 100 whilst the required inward pressure is applied by the manipulation of the trigger 30.

The ram end 41 of the shaft has a flange 56 fitted to and secured to the shaft in various manners, e.g. by interlocking profiles 46, 57 or by welding. The flange 56 has pins or recesses 58 which engage with corresponding recesses or pins in the adaptor plate 140. The ram end 132 of the tube fits into an aperture 55 in a flange 54 which cooperates with the shaft flange 56 in order to purposefully project the ram 140 outwards from the tool 1 when operated as required. In order to minimise the friction imparted by any rotational movement of the shaft flange 56 against the tube flange 54, a low friction material washer 53 or the like is employed between abutting surfaces of the flanges.

The adaptor plate 140 is attached to the shaft flange 56 and hence to the shaft. One method of attachment comprises magnetic means. Retention magnets 59 are preferably fitted to the shaft flange 56.

A distal end 42 of the shaft comprises means for rotating the shaft in the form of a leverage bar 48 which passes through a bore 57 in the distal end 42. Bar ends 49 are fitted on the leverage bar 48. A user may use the leverage bar 48 to rotate the shaft 40 within the tube 130. Rotation of the shaft 40 rotates the shaft flange 56 and attached adaptor plate 140. This rotates the wind back piston 100. The rotation can be done simultaneously with the longitudinal motion.

FIG. 12b shows a further adaptation in which the washer grippers 61 have protrusions 68 on one surface. As an alternative to protrusions 68, spacers 66 can be used. Typically stamped grippers 61 have a slight "edge" or burr and thus can catch on one another when stacked and then cantered. The protrusions or spacers alleviate this problem. A spacer may have a smaller circumference that the gripper and be a thin shim washer. A self-lubricating or slippy material may also be used to obviate the problem. In the embodiments of FIGS. 12a and 12b, the washer grippers 61 are formed with a projection 69 which forms an anchor for each gripper 61 so that the washer grippers are cantilevered when the trigger is activated.

It will be appreciated that the tube 130, means for rotating the shaft and adaptor plate 140 may be incorporated in all the described embodiments.

Figure 13A:
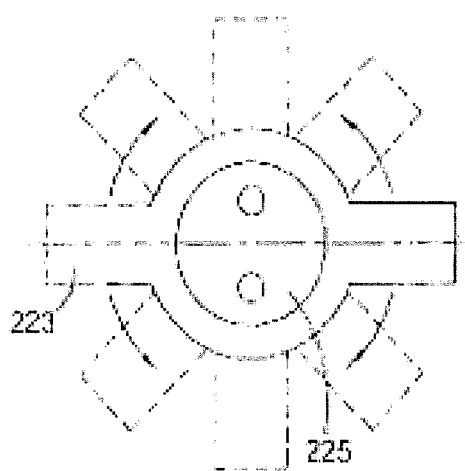
FIG. 13a is a front view of a brake pad spreader tool.
Figure 13B:
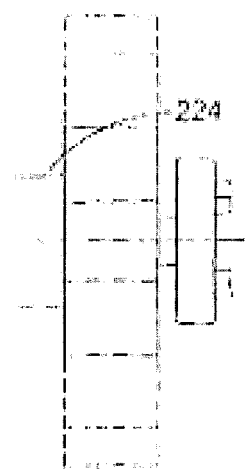

FIGS. 13a and 13b show a further adaptation in which the cross-members or abutment 223 is rotatable to a plurality of different positions. The abutment 223 comprises an opposed pair of members and various positions of these members are shown by the dotted lines. The advantage of a rotatable abutment is that it allows the tool to be used in many different orientations. A locking mechanism 224 may be incorporated into the tool to lock the abutment in a desired position. The locking mechanism may be any known mechanism, e.g. a locking ring. The locking mechanism may be incorporated behind the rotatable abutment, i.e. on the opposed side to the adaptor plate 225 which contacts the brake caliper.

Figure 14A:
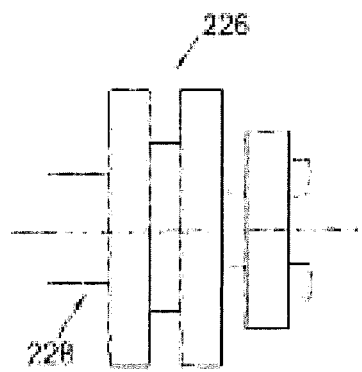
FIG. 14a is a side view of part of a brake pad spreader tool.
Figure 14A:
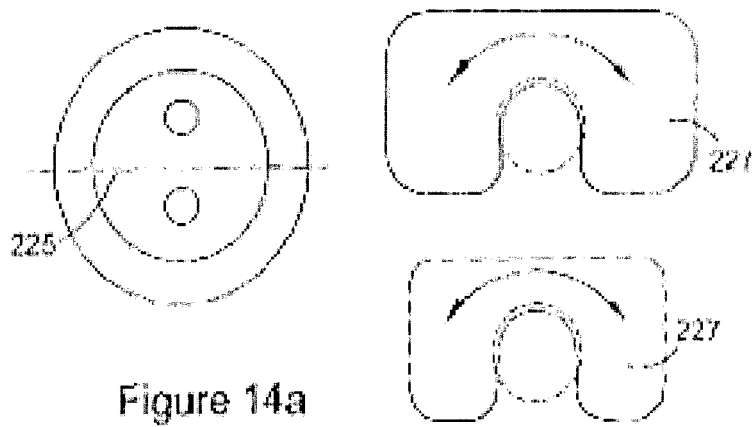

FIGS. 14a and 14b illustrate an alternative to the rotatable abutment of FIG. 13a. In this embodiment, the abutment 226 is detachable and comprises a pair of members 227 in the form of reaction plates or shoulders. Each member has a recess which engages the shaft. The shaft may be formed with a recess to hold each member in place. As shown in FIG. 14b, each member is rotatable so that the position may be altered to provide the advantages of the abutment described above. The members 227 are attachable to the shaft so that they projecting in opposed directions from the body. A locking mechanism 228 may be incorporated behind the rotatable abutment, i.e. on the opposed side to the adaptor plate 225.

It will be appreciated that the rotatable abutments of FIG. 13a or 14a may be incorporated in any of the embodiments described above.

REFERENCE NUMBERS USED IN THE DRAWINGS 1 brake caliper tool
20 frame
21 shaft throughbore
22 pistol grip handle
23 frame cross members
24 frame foremost portion
30 trigger
31 trigger pivot pin
32 levered end
40 shaft
41 shaft ram end
42 distal end
43 handle
44 square section rod
45 flat shaft surface
46 shaft/flange interlocking profile
47 shaft bar bore
48 leverage bar
49 bar ends
50 ram
51 stepped ram
52 wind back adaptor
53 low friction thrust bearing
54 tube flange
55 tube flange inner profile
56 shaft flange
57 shaft to flange inner profile
58 shaft flange engagement holes
59 retention magnets
60 drive mechanism
61 gripping washers
62 gripping washer openings
63 gripping washer edges
64 clamping strips
65 square holed gripping washers (see FIG. 5B)
66 distance niece (see FIG. 5A)
67 friction material
68 protrusions
69 cantilever
70 resilient member
71 lock resilient member
80 locking mechanism
81 elongate gripping washer (see FIG. 8)
90 caliper
91 caliper housing
92 piston
93 caliper housing closed end
94 bore open end
95 caliper pad support bracket
96 support bracket opening
97 piston closed first end
98 piston open second end
99 support bracket inner surface
100 wind back type piston
101 piston/pad abutment surface
102 piston engagement holes
120 detachable ram outer cylinder
121 cylinder engagement flats
122 cylinder engagement pins
123 cylinder engagement pin holes
124 cylinder piston abutment surface
125 cylinder outer circumferential surface
126 piston seal
130 tube
131 tube inner bore
132 flange profile
140 wind back adaptor plate
141 engagement pin holes
142 adaptor plate pins
223 rotatable abutment
224 locking mechanism for 223

225 adaptor
226 rotatable abutment
227 members for 226
228 locking mechanism for 226

The invention claimed is:

1. A hand operable brake pad spreader tool for use with a brake caliper having a caliper body supporting spaced opposed brake pads arranged to sandwich a brake disc, said caliper body including a caliper piston operable to clasp the brake pads against the brake disc, said tool comprising:
- a frame including a frame forward end, and an elongate, axial frame throughbore, said frame throughbore having a longitudinal axis and extending through the frame forward end;
- a manually operable handle pivotally mounted on said frame;
- a tube slidably mounted in said frame throughbore, said tube including a longitudinal axis, a tube forward end extendable through the frame throughbore of the frame and a rear distal end;
- a rotatable shaft located in a tube throughbore, said shaft including a shaft forward end and a shaft distal end;
- a caliper piston engagement member mounted to the shaft forward end and outward of a throughbore forward end, said shaft in said tube capable of independent rotation and longitudinal movement about the axis in said tube; and
- a tube gripper assembly located in the frame, said gripper assembly positioned for engagement with the tube by pivotal movement of the handle to advance the tube and rotatable shaft simultaneously in the forward direction in the frame throughbore.

2. The tool according to claim 1, wherein the gripper assembly comprises at least one gripping member arranged for frictional contact with the tube.

3. The tool according to claim 1, wherein the piston engagement member is detachably mounted on the shaft.

4. The tool according to claim 3, comprising magnetic means for retaining the piston engagement member on the shaft.

5. The tool according to claim 1, wherein the piston engagement member includes an array of pin bores for receiving driving pins adapted to engage in corresponding bores in the piston.

6. The tool according to claim 1, wherein the piston engagement member comprises a member rotatably mounted on the shaft.

7. The tool according to claim 1, wherein the piston engagement member comprises a portion adapted for driving engagement with a spanner device.

8. The tool according to claim 1, including means for manually rotating the shaft.

9. The tool according to claim 6, comprising means for locking the piston engagement member in a desired position on the shaft.

10. The tool of claim 1 wherein the piston engagement member is detachable from the rotatable shaft.

11. The tool of claim 1 including a frame cross member at the frame forward end.

12. The tool of claim 11 wherein the frame cross member is detachable from the frame.

13. The tool of claim 1 further including a biasing member on said tube intermediate the gripper assembly and the piston engaging member.

14. The tool of claim 1 wherein the piston engagement member is affixed to said shaft and capable of rotation therewith.

* * * * *